Feb. 2, 1960
E. B. CAMPBELL
2,923,512
LOADING PALLET BOARD
Filed Jan. 17, 1957
3 Sheets-Sheet 1
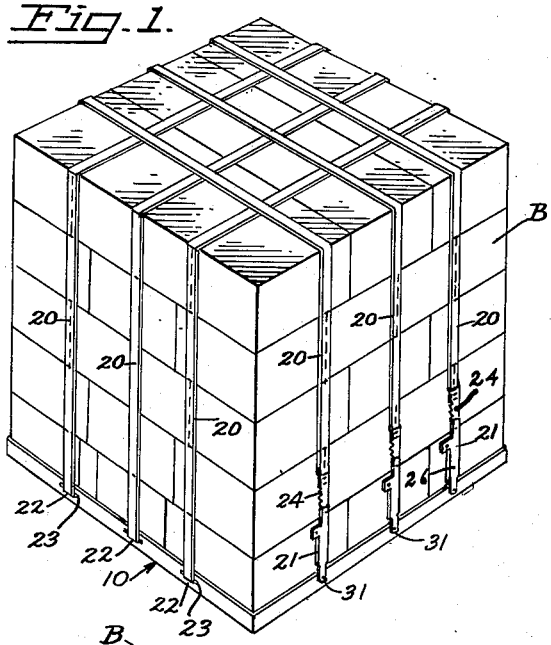
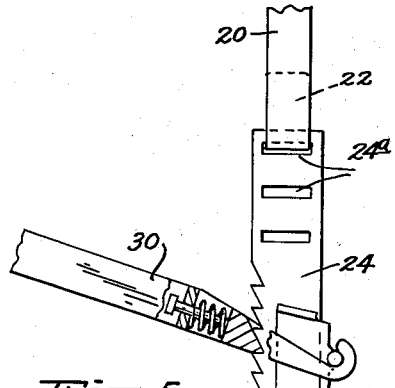
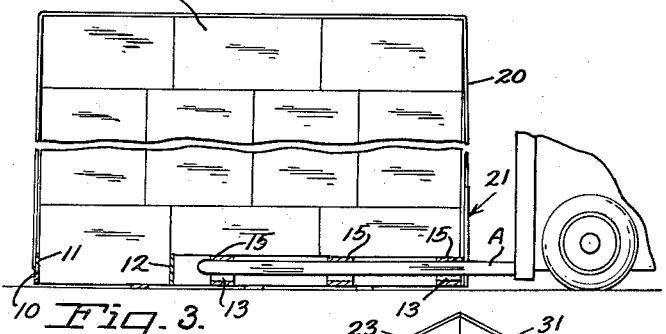
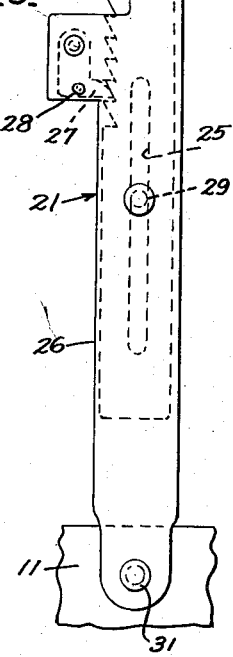
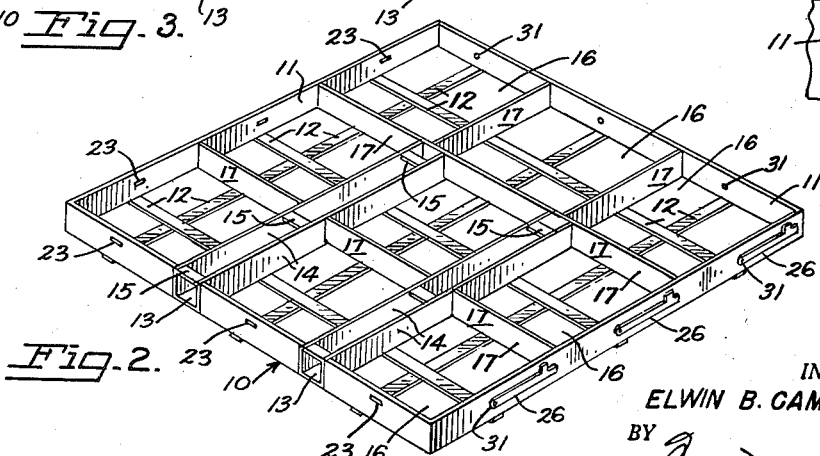
INVENTOR.
ELWIN B. CAMPBELL
BY
ATTORNEY

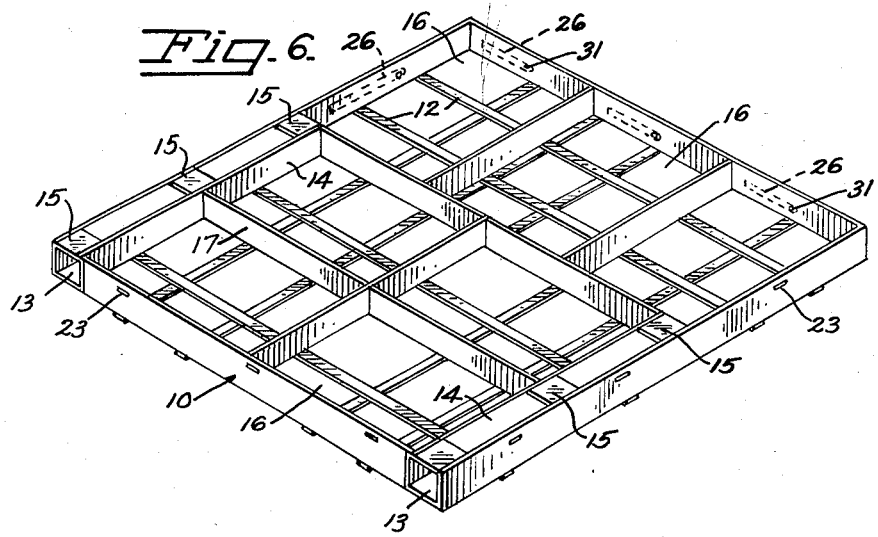
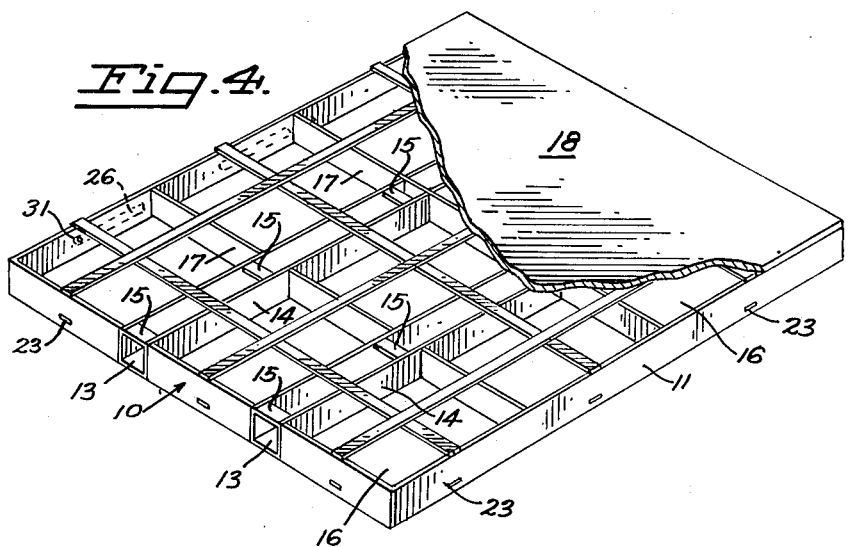

2,923,512
LOADING PALLET BOARD

Elwin B. Campbell, Orinda, Calif.

Application January 17, 1957, Serial No. 634,751

7 Claims. (Cl. 248—120)

This invention relates to pallet boards and more particularly relates to rigid pallet boards in which there are provided tunnels or channels for receiving tines of a fork of a hositing apparatus such as a lift truck and in which the tunnels or channels are above the receiving or loading platform of the boad, and preferably in which the loading platform is compartmentalized by upstanding walls. These boards are generally referred to as pallets, and may be so termed herein.

Pallet boards in general provide a pair of planar relatively spaced parallel platforms which receive therebetween the fork members of a hoisting apparatus, which usually is a lift truck. Such space is usually also occupied by cross supports or supporting beams of the board. Since the pallets and the commodity thereon are transported or stacked for storage as a unit, the space between the spaced platforms is wasted space, which in shipment and warehousing is quite valuable.

One of the objects of the present invention is to provide a rigid pallet having a loading platform having at one face thereof upstanding peripheral sidewalls and tunnels for receiving forks or prongs of lifting apparatus, the remainder of area of said face being open for storage, and thus conserve the space normally present between the spaced platforms of the usual pallet. Among other objects are to provide a strong rigid pallet of relatively light weight, and preferably to provide compartmentalized sections within the sidewalls at the loading face of the pallet.

Briefly described the invention comprises a rigid pallet having a receiving or supporting open-work or latticed-strip platform provided with upstanding peripheral sidewalls. Also upstanding from the plane of the supporting strips are tunnels or channels for receiving the tines of the fork of a hoisting apparatus, the tunnels preferably extending beyond the center of the pallet, and may, if desired, extend the entire width thereof. Preferably the pallet may also have transverse division walls for dividing the planar area thereof into sections or compartments. There may also be provided binder strap means including a take-up mechanism for drawing binding straps tight around a cargo placed upon the board, in which the take-up mechanism is foldable flatly against the side wall of the pallet when not being employed for binding cargo upon the platform.

One form in which the invention may be exemplified is described herein and illustrated in the accompanying drawings which are made a part hereof.

In the drawings:

Fig. 1 is a perspective view of a pallet of the invention having a load strapped thereon.

Fig. 2 is a perspective view of the pallet showing strap jacks at a folded position.

Fig. 3 is a fragmentary vertical transverse section through tunnel members of the pallet and illustrating the employment of a fork lift truck.

Fig. 4 is a perspective view of a reversed or bottom view of the pallet of Fig. 2 and a fragmentary sectional view of a planar board thereon.

Fig. 5 is a side elevation of a strap-jack member for tightening straps of a loaded pallet.

Fig. 6 is a perspective view of a modified form of pallet board.

Figure 8:
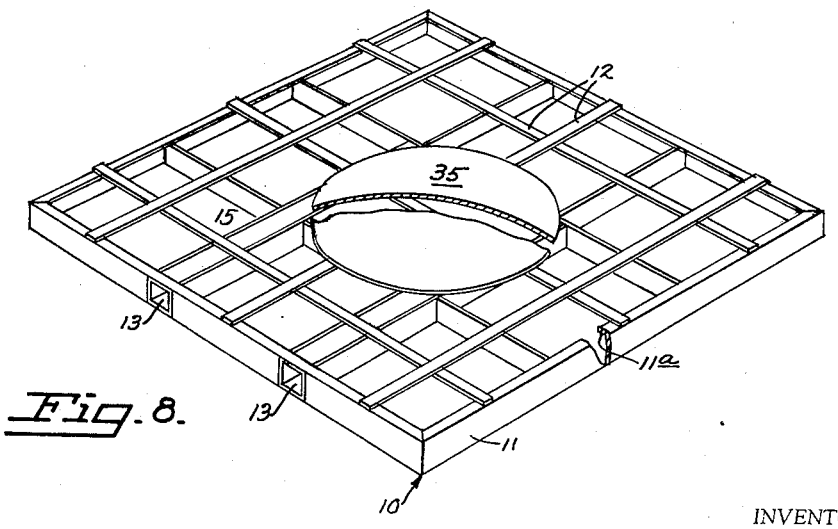
Fig. 8 is a perspective of a reversed or bottom view of the type of pallet board of Fig. 2 showing a turntable plate at the under face of the pallet, and flanged sidewall members, as modifications.

Referring to the drawings in which like reference characters indicate corresponding parts in the several views, the pallet comprises a skeleton frame generally indicated 10 having around its periphery rectangularly disposed upstanding rigid strips providing side walls 11, which may, if desired, be of angle iron construction providing a flange 11a as shown in Fig. 8. In the plane of one edge of the sidewalls the frame is open and in the plane of the opposite or base edge of the sidewalls there is a loading platform comprising rigid relatively intersecting supporting strips 12 extending longitudinally and laterally transversely across the pallet substantially in the plane of said base edge, the strips in each of said directions being relatively spaced and parallel. At their opposite ends these strips 12 are fixedly connected by welding between the relatively corresponding edges of opposite side walls 11 and preferably are welded at the intersections of the strips providing a loading platform of open lattice work which is recessed within the peripheral side walls, and having strength and rigidity at great savings of material and weight.

Figure 7:
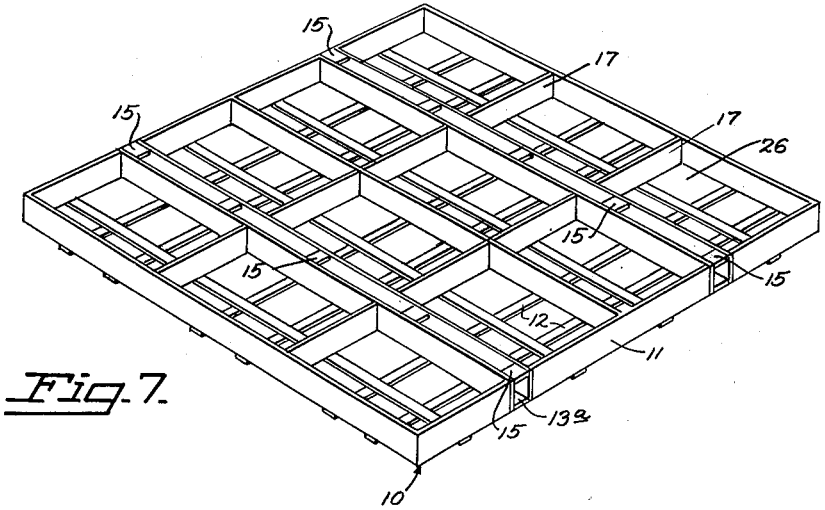
Fig. 7 is a perspective view of another modified form of pallet board.

Transversely of the pallet there are tubular tunnels or channels 13 provided for receiving therein the tines or lifting fork members A of a lift truck or other hoisting apparatus. These tunnels 13 may be of any suitable tubular elongated construction such as pieces of pipe, tubing, half round or the like, but preferably, as shown in the drawings, comprise rigid elongated rectangular channels having parallel elongated relatively spaced side walls 14 upstanding from the loading platform, the sidewalls of the tunnels being preferably of substantially the same height as the peripheral side walls 11. Connecting the upper and lower parallel edges of the side walls of the tunnels are relatively spaced cross webs or plates 15 which are flushly aligned with the plane of the adjacent edge of the side walls of the tunnels. The cross webs 15 are of sufficient strength to carry the load upon the pallet. The reinforcing and supporting platform strips 12 which are perpendicular to the tunnels extend across the planar area underlying the tunnels and the tunnels may have the abutting edges of the upstanding tunnel walls 14 welded thereto, and thus prevent any lateral spreading of the side walls of the tunnels as best shown in Fig. 4. The tunnels may be of lesser length than the corresponding dimension of the pallet, such as shown in Figs. 2 and 6 in which they extend beyond the center line, but short of the entire width of the pallet, two-thirds of such dimension of the pallet being preferred, since such a length extends beyond the center of gravity of the board and facilitates tipping of a loaded pallet toward a lifting apparatus rather than away from it. Alternatively the tunnels may extend the entire width of the pallet as at 13a in Fig. 7. It is preferred that there be two of the tunnels 13 relatively parallelly spaced to distribute the support of stress of weight as evenly as practicable for the planar area of the pallet, though the precise positioning of the tunnels may be varied to meet needs of the individual designs of pallets. In Figs. 2 and 7 the tunnels are shown relatively spaced centrally of the pallet whereas in the modification of Fig. 6 the tunnels are at the opposite edge portions of the pallet.

The planar supporting area of the loading platform of the pallet may be divided into compartments or sections 16 by rigid transverse compartment division partition walls 17. These division walls are preferably of the same height as tunnels 13 and the peripheral side walls 11, and may be welded to each other and to the supporting strips 12 as well as to the side walls.

It is preferred, as shown in Figs. 2 to 8, that the supporting strips 12 shall intersect each other within the plane defined by each compartment 16. The welding of the intersecting strips 12, and the compartment walls 17 and the sidewalls in the manner as described, and the providing of uniformity of height of the sidewalls, compartment walls and tunnel walls provides a braced truss between the planes of the upper and lower edges of the sidewalls, with the tunnels extending into that trussed structure. It is to be further noted that each end of the tunnels is supported by a cross member which extends across the board perpendicularly at the end of the tunnels and is connected to relatively opposite sidewalls which are parallel to the tunnels. This cross support at the ends of the tunnels may comprise the sidewalls 11 as in Fig. 7 or sidewall 11 and compartment wall 17, as in Figs. 2, 4, and 6.

The planar shapes of the sections or compartments 16 are elective for various sizes of boxes or commodities to be received therein. It is preferred that on any single pallet the tunnels 13, side walls 11 and partition walls 17 be so arranged that all of the compartment 16 of the pallet shall be substantially similar in shape and planar area, allowance being made for the transverse width of the tunnels, the width of the tunnels, where necessary for substantially equalizing such shape and planar area, being spread over the dimension of the compartment wall of two abutting compartments to maintain substantial uniformity of size of all compartments as nearly as possible, as in Fig. 2. However, the placement or arrangement of the compartments on the pallet may be varied, as exemplified in Fig. 6 as compared with Fig. 4. It is also preferred that the tunnels and compartments shall be arranged on the pallet so that the side walls of the tunnels serve the additional purpose of structural compartment walls. In this connection it may be noted that boxes for shipment and storage of goods usually are in several well-defined and generally accepted sizes so that the sizes of such sections may be standardized to the size of those containers usually employed, or the dimensions of the compartments may be adapted to the size of containers of a particular customer. However, it is to be further observed that in the event of necessity to employ the pallet for shipping or storing containers of miscellaneous sizes or of irregular dimensions or which are too large to enter into the compartment sections, either the face of the pallet may be employed as a planar loading platform on which goods or containers may be stacked, as shown in Fig. 4, and, if desired, a planar board 18 may be employed to provide a closed area at the loading face of the pallet.

Since the load placed upon a pallet is usually composed of stacked units B it is usual to secure such loads to the pallet by wire-tie or binding straps 20 which are tensioned upon the load at time of stacking, but which make no provision for subsequent tightening when the load and contents settle or become smaller in size due to the vibration and jolting of transport. Any suitable conventional binding straps or tie means may be employed with the pallet, many of which are commerically available. Since, however, it may be desirable to tighten a load after it has jolted down, it is preferred that binding means be provided for securely stabilizing a load on the pallet at time of stacking, and for subsequent tightening if necessary after the load has settled from jolting in either transport or storage. Such means for subsequent tightening of the binding wires or straps should therefore accompany the pallet as a unitized part thereof since it may be in course of transit that such additional tightening becomes necessary. Such pallets are normally returned to the source of shipment after unloading, and with the means herein employed for such tightening, both the tightening means and the binding straps are returned with the pallet.

The preferred form of binding means comprises any suitable wire or strap 20 and a relatively simple form of tightening means, such as a ratchet jack 21. The binding straps or wires may have a hook 22 at each end which may be releasably engaged at one end in a slot 23 in an upstanding peripheral side wall of the pallet, and, after passing around the load, may have the opposite hooked end thereon releasably engaged in one end of a toothed ratchet bar 24 by means of a transverse slot 24a. The ratchet bar is also provided with a longitudinal elongated slot 25 for purposes to be described. The ratchet bar 24 slides into one end of a slotted casing 26, the casing having at one edge thereof a pivoted locking detent dog or tooth 27 to releasably engage and lock into the teeth of the ratchet bar. The dog and the side wall of the casing have registering eyelets 28 through which a wire may be passed to secure the dog against inadvertent release. A pin 29 passes through the slotted casing and is engaged in the elongated slot 25 so that the ratchet bar may slide in the casing without being detached therefrom. Any suitable lever means 30 may be employed for tightening the strap by means of the ratchet rack and dog, such lever being a separate device.

At its opposite end the slotted casing 26 is fixedly secured to the peripheral side wall 11 of the pallet by pivotal mounting 31 whereby the casing of the jack including the ratchet bar may be folded alongside of the peripheral side wall of the pallet when not in use, as shown in Fig. 2. By means of the ratchet jack accompanying the pallet, the load may be cinched tight not only at time of loading but also at any time of transport or storage. Another purpose of securing the slotted jack and ratchet bar portion fixedly to the pallet is that it is returned with the pallet by the party who unloads the pallet and also encourages the return of the straps with the pallet, which may readily be done by placing the loose straps in one of the compartments or winding it around the pallet. Such return of binding means and straps will result in substantial savings of expense.

The tunnels may be of convenient dimensions of height, width and length according to the area of the board, the height and width and length being very generally standardized to meet the size and length of tines or prongs of the forks of lift devices to enter opening 3 or 4 inches square which are also generally standardized. The general standardized thickness of the conventional wooden board pallet having two parallel spaced decks or platforms is approximately 6 inches, and its two planar faces extend entirely across the area of the board. Therefore, in a board 4 feet by 4 feet there is within a two-platform wooden board a loss of substantially 8 cubic feet of storage space. In the pallet of the present invention, (in the examples in which the tunnels extend about two-thirds of the width of the board), assuming the same planar area of board (4 feet square), and tunnels 4 inches square and 32 inches long (two-thirds the width of the pallet), the cubic volume taken by the two tunnels is approximately 1024 cubic inches, or approximately two-thirds of one cubic foot, resulting in a saving of substantially seven cubic feet of storage space.

In the modification shown in Fig. 7 the tunnels 13a extend the entire width of the board and are open at both of the opposite ends whereby the forks of a fork lift truck may engage in the tunnels from either side of the pallet. However, there may be mounted at the under face of all forms of the pallet, a turntable disc 35 as exemplified in Fig. 8, which is preferably planar at its inner face which is connected by welding to the pallet, and substantially convex or saucer-shaped at its opposite or outer face, the thickness of such disc being sufficient only to provide a convex pivot plate on which a pallet may be rotated, principally for the purpose of turning it to a position convenient for accessibility of the tunnels for lifting by a fork-lift truck, an example of such thickness may be one-half to three-fourths of an inch.

It is to be understood that the strips and walls throughout the entire board structure may be relatively secured by any suitable means, such as welding, at intersecting and connecting points.

In operation, separate container boxes or a bulk load may be placed on the loading platform of the pallet within the confines of the sidewalls which stabilizes the load upon the pallet. Since the tunnels are upstanding from the loading face of the pallet, the first layer of the commodity load must be placed on the recessed loading platform along the sidewalls of the tunnels, though the superimposed higher levels of such commodity may, by suitable arrangement thereof, overlie the tunnels, thus also utilizing the planar area above the tunnels. The division or compartment walls, when employed, reinforce and add to the rigidity of the pallet structure and stabilize the commodity load longitudinally and laterally at the face of the board, since it will be realized that though the containers or load may be adapted to conveniently fit into the compartments, they should not be sufficiently wedged or fitted tightly which would make it difficult to either pack or unpack the commodity on the pallet.

The load having been packed or stacked to a desired height, the binder straps may be positioned and tightened by the ratchet jacks, both at initial loading and during transit or storage, if necessary. Upon unloading, the straps may be detached from the jacks, whereupon the jacks may be folded along the sidewall of the pallet to which they are pivoted.

In operation of the pallet in connection with a fork-lift apparatus, it is obvious that it is intended that the prongs of the lift fork shall slide into and be withdrawn from the tunnels in the usual well known manner of lifting and transporting a pallet by such lifting fork apparatus, and that if it is necessary to adjust the position of the pallet for access to the tunnels, such adjustment may be accomplished by rotative adjustment of the pallet on the turn-table disc.

What is claimed as new and patentable is:

1. A loading pallet comprising a rigid frame having a planar loading platform, rigid strip sidewalls fixedly connected at one edge to and upstanding from one face of the platform around the periphery of said platform, the said pallet being open in the plane of the opposite free edge of the side walls, relatively spaced parallel tunnel member having elongated upstanding walls extending from a peripheral side wall and overlying the planar area of the loading platform at the face thereof which mounts said peripheral side walls, one end of the tunnels being open through a peripheral side wall whereby fork members of a hoisting apparatus may be inserted in said tunnels, and fixedly mounted longitudinal and lateral partition walls upstanding from the loading platform transversely within the frame and dividing the interior of the frame into sectional compartments, said loading platform comprising relatively spaced longitudinal and lateral transverse supporting strips which intersect relatively, a portion of the strips intersecting each other in underlying relation to each of said compartments.

2. A loading pallet as set forth in claim 1, a portion of said supporting strips which are perpendicular to the tunnels extending across and underlying the elongated upstanding walls of the tunnels and being secured thereto.

3. A loading pallet as set forth in claim 1, and in which said compartments are of substantially similar shape and planar area.

4. A loading pallet device of the character described as set forth in claim 1, the free upper edge of said tunnels, compartment walls and side walls being of substantially similar height from the plane of the loading platform and are fixedly secured relatively whereby a truss board structure is provided which is the height of the side walls, and in which the said tunnels extend into the trussed structure between the planes of the relatively opposite edges of the side walls.

5. A loading pallet device as set forth in claim 1 and which includes a ratchet jack member having one end pivotally mounted to the exterior of a peripheral side wall of the pallet and having at its other end a ratchet slide bar slidably connected thereto and means for releasably locking the ratchet slide bar at a predetermined position in the jack.

6. A loading pallet comprising a rigid frame including upstanding rigid peripheral rectangularly connected strips providing side walls freely open at the plane of one edge thereof and having at the plane of the opposite edge of the side walls relatively spaced longitudinal and lateral transverse strips extending between opposite side walls providing a latticed planar loading platform, the ends of said strips being fixed to the adjacent edge of the side walls, relatively spaced parallel rigid tunnel members extending transversely from a peripheral wall and overlying the plane of the loading platform at the face thereof which mounts said peripheral side walls, one end of said tunnels opening through a peripheral side wall whereby fork members of a hoisting apparatus may be inserted therein, and relatively spaced rigid partition strips upstanding from the platform and dividing the area of said platform into compartments of substantially similar shape and planar area, a side wall of said tunnels being also a partition wall of a compartment, and the said latticed supporting strips intersecting relatively in underlying relation to each of the sectional compartments.

7. A loading pallet device of the character described as set forth in claim 6, and including a turntable means centrally underlying said latticed platform.

References Cited in the file of this patent

UNITED STATES PATENTS

| | | |
|---|---|---|
| 846,786 | Eshelman | Mar. 12, 1907 |
| 907,233 | Heller | Dec. 22, 1908 |
| 945,334 | Lent | Jan. 4, 1910 |
| 974,469 | Butt | Nov. 1, 1910 |
| 1,975,291 | Ritter | Oct. 2, 1934 |
| 2,385,407 | Endress | Sept. 25, 1945 |
| 2,534,011 | Frye | Dec. 12, 1950 |
| 2,555,635 | Dickerman | June 5, 1951 |
| 2,576,715 | Farrell | Nov. 27, 1951 |
| 2,623,760 | Fornelius | Dec. 30, 1952 |
| 2,664,219 | Schmidt | Dec. 29, 1953 |
| 2,685,398 | King | Aug. 3, 1954 |
| 2,709,559 | Geisler | May 31, 1955 |
| 2,770,359 | White et al. | Nov. 13, 1956 |

FOREIGN PATENTS

| | | |
|---|---|---|
| 135,910 | Australia | Jan. 16, 1950 |